United States Patent
Wu

Patent Number: 6,125,179
Date of Patent: *Sep. 26, 2000

[54] ECHO CONTROL DEVICE WITH QUICK RESPONSE TO SUDDEN ECHO-PATH CHANGE

[75] Inventor: Ying Wu, Grass Valley, Calif.

[73] Assignee: 3Com Corporation, Rolling Meadows, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/571,710

[22] Filed: Dec. 13, 1995

[51] Int. Cl.[7] .............................. H04M 1/00; H04M 9/00
[52] U.S. Cl. ........................ 379/388; 379/400; 379/406; 379/410
[58] Field of Search ..................................... 379/406, 410, 379/411, 409, 388, 392, 400; 307/32.1; 370/286, 288, 289, 290, 291

[56] References Cited

U.S. PATENT DOCUMENTS

| | | | |
|---|---|---|---|
| 4,021,623 | 5/1977 | Suyderhoud et al. | 379/411 |
| 4,593,161 | 6/1986 | Desblanche et al. | 379/410 |
| 4,697,261 | 9/1987 | Wang et al. | 370/32.1 |
| 4,764,955 | 8/1988 | Galand et al. | 379/411 |
| 4,951,269 | 8/1990 | Amano et al. | 367/135 |
| 5,117,418 | 5/1992 | Chaffee et al. | 370/32.1 |
| 5,307,405 | 4/1994 | Sih | 379/410 |
| 5,477,535 | 12/1995 | Lahdemaki | 370/32.1 |
| 5,561,668 | 10/1996 | Genter | 370/32.1 |
| 5,668,871 | 9/1997 | Urbanski | 379/406 |
| 5,680,450 | 10/1997 | Dent et al. | 379/388 |
| 5,696,819 | 12/1997 | Suizu et al. | 379/390 |
| 5,696,821 | 12/1997 | Urbanski | 379/406 |
| 5,699,423 | 12/1997 | Yoshida et al. | 379/390 |

*Primary Examiner*—Krista Zele
*Assistant Examiner*—Allan Hoosain
*Attorney, Agent, or Firm*—McDonnell Boehnen Hulbert & Berghoff

[57] ABSTRACT

An Acoustic Echo Control (AEC) device operates to reduce acoustic echo feedback in a speakerphone. An adaptive echo canceller responds to a far-end speech signal to generate an estimated echo which is subtracted from a near-end speech signal, to generate a compensated near-end speech signal. An Echo Return Loss (ERL) estimator provides an accurate but gradually adjusted estimate of the ERL of the echo canceller. A non-linear processor responds to the ERL estimation and provides additional attenuation to maintain the overall system ERL. The AEC device also incorporates dual talking mode detectors, one for the adaptive filter and one for the non-linear processor, to detect a plurality of talking modes, which are used to control the adaptation of the adaptive filter and the attenuation provided by the non-linear processor. A convergence indicator responds to the sudden echo path changes, and quickly corrects the ERL estimation; thereby adjusting the talking mode detector and the non-linear processor accordingly to maintain the overall system ERL and stability.

22 Claims, 1 Drawing Sheet

ECHO CONTROL DEVICE WITH QUICK RESPONSE TO SUDDEN ECHO-PATH CHANGE

BACKGROUND OF THE INVENTION

The present invention relates generally to voice communication systems and, more particularly, to an electronic system for reducing acoustic echo. Speakerphones, which employ one or more microphones together with one or more speakers to enable "hands-free" telephone communication, can allow "hands-free" communications as well as participation in a conversation by a number of persons. Modern speakerphones are capable of operating in a variety of modes, which include, single-talking mode in which the transmission of voice information is in a single direction, and double-talking mode, in which the voice information is transmitted by both sides, which increases the interactivity of the conversation, but also causes a phenomena known as "acoustic feedback echo", in which acoustic energy transmitted by the speaker of the speakerphone is picked up by the microphone of the same speakerphone. Typically, speakerphones utilize an Acoustic Echo Control (AEC) device to reduce this echo by generating an estimate of the expected feedback ("acoustic echo") between the speaker and the microphone, and subtracting the expected echo from the signal produced by the microphone (the "near-end signal") before transmission of the signal to a remote communications station. Generally, the AEC device is adaptive in the sense that changes in the acoustic echo path are accounted for in generating the estimated echo.

Typical AEC devices consist of an echo canceller filter cascaded with a non-linear processor. The echo canceller filter generates a linearly corrected near-end signal and the non-linear processor, in conjunction with a talking mode detector, which detects various talking modes (single-talking, double-talking, etc.), provides additional echo attenuation for certain talking modes. The additional attenuation provided by the nonlinear processor increases the echo cancellation performance, also known as the echo return loss enhancement, but reduces the degree of the double-talking operation, therefore, reducing the interactivity of the conversation. Thus a typical echo control device strikes a compromise between the interactivity and the echo return loss performance.

Under steady state conditions, the echo canceller converges to very nearly cancel the echo, tracking only gradual changes to avoid instability. Sudden changes occurring in the echo path, such as a relative repositioning of the speaker and microphone disturb the system. Typical echo-cancellers and nonlinear processors are slow to respond to a sudden change in the echo path. Thus, when a change happens, the system performance, such as echo return loss enhancement and stability, is significantly degraded until the system eventually re-converges.

To respond to sudden changes in the echo path, some AEC devices utilize a convergence detector to monitor the convergence of the echo canceller filter. Such detectors rely on the principle that the adaptive filter will diverge when sudden echo path changes occur. The degree of convergence of the filter can be detected by examining the cross-correlation between the estimated echo and estimation error.

By the principle of orthogonality, the cross-correlation should be nearly zero when the filter is converged. However, for a practical environment, and especially in the presence of double-talk (double-talking operation), false divergence detection is frequent. This is because speech from independent sources (near end, far end) has similar spectral and temporal characteristics, and detectors which employ short-term estimation tend to predict a non-zero cross correlation. Only if averaged for a substantial time can the cross-correlation be guaranteed to approach zero. Thus, a convergence detector based solely on cross-correlation is necessarily a compromise between accuracy and response time.

SUMMARY OF THE INVENTION

In a principle aspect, the present invention takes the form of an acoustic echo device, exhibiting a high degree of stability and provides quick and accurate response to sudden changes in the echo path. The acoustic echo device includes an adaptive echo canceller which adaptively modifies a near-end speech signal to cancel an acoustic feedback echo component in the signal to generate a modified near-end signal; the acoustic feedback being generated by a far-end speech signal received by the device. An echo return loss estimator provides an estimate of the echo return loss of the echo canceller. A means, responsive to the estimated echo return loss proportionally attenuates the modified near-end speech signal to substantially cancel acoustic feedback contained in the modified near-end signal.

Thus, an object of the present invention is to provide a rescue device to detect sudden echo path changes and to adjust the non-linear processor accordingly to compensate for such changes. A further objection is to provide a reliable filter convergence detector for the various talking modes by introducing an energy normalization factor. It is a further object to provide a unified mechanism to react to a sudden echo-path change. It is a further, more specific object to be able to both respond quickly to the true detection, and to recover quickly from the false detection.

In additional aspects, the acoustic echo control device employs a convergence detector which is responsive to sudden echo-path changes and which corrects the estimated echo return loss of the adaptive echo canceller to maintain the overall echo return loss and system stability.

These and other objects, features, and advantages of the present invention are discussed or apparent in the following detailed description.

BRIEF DESCRIPTION OF THE DRAWINGS

The preferred embodiment of the present invention is described herein with reference to the drawings wherein.

DETAILED DESCRIPTION OF THE PREFERRED EMBODIMENT

Figure 1:
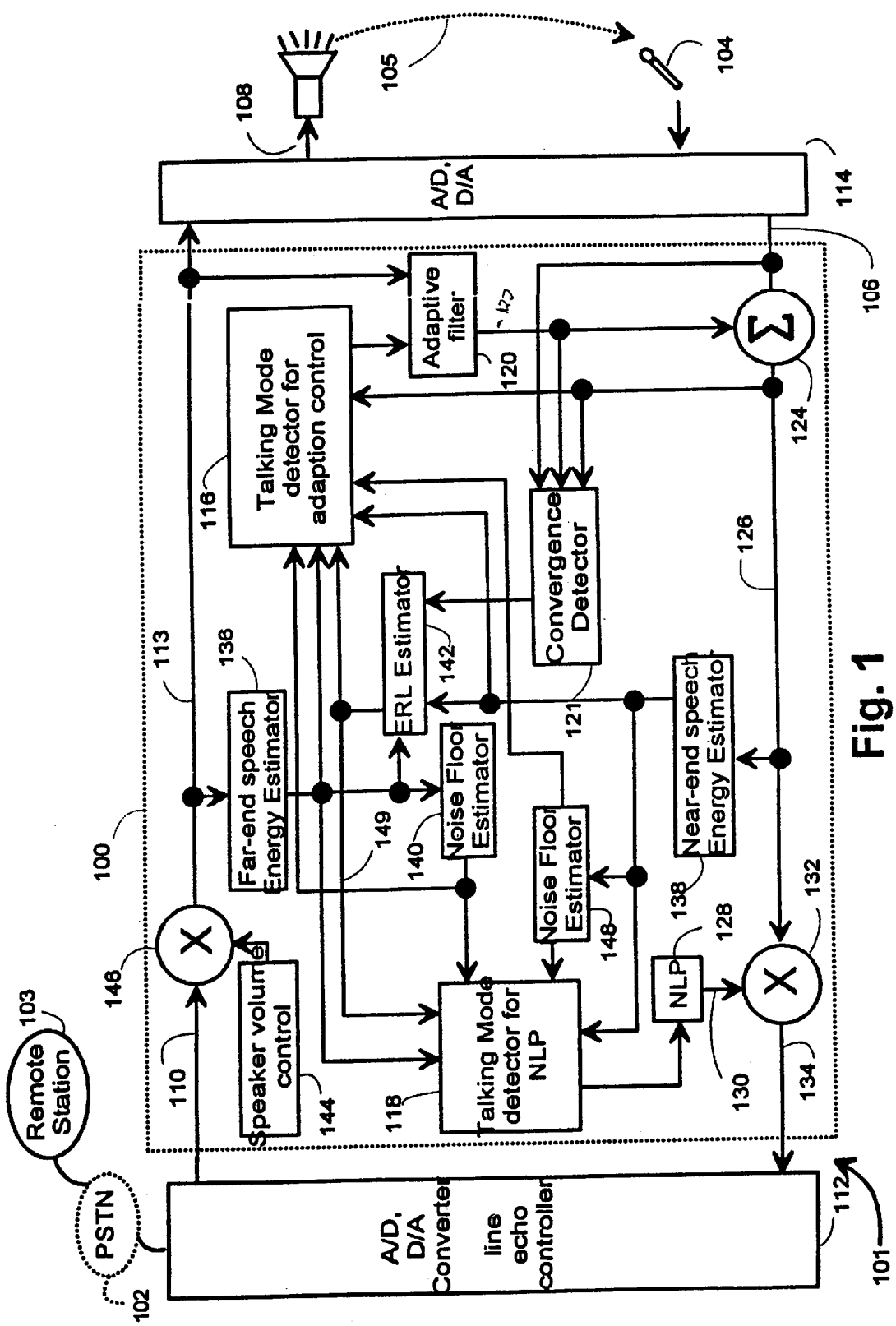
FIG. 1 is a block diagram of an electronic system utilizing the present invention.

FIG. 1 of the drawings shows a block diagram of a preferred AEC device 100, for use in a speakerphone, seen generally at 101, to reduce acoustic feedback echo, seen schematically at 105, from speaker 108 to microphone 106. As seen in FIG. 1, the speakerphone 101 may be coupled via the Public Switched Telephone Network (PSTN) 102 to a remote station 103 which may take the form of a conventional telephone or a speakerphone. The speakerphone 101 includes a microphone 104 for detecting acoustical energy to produce a near-end speech signal 106 and a speaker 108 for generating acoustical energy in accordance with far-end speech signal 110. The far-end speech signal 110 is generated by module 112 which digitizes the signal received from the remote station 103 and cancels line echo if such echo exists. Module 114 digitizes the incoming signal from microphone 104 to generate the near-end speech signal 106.

Far-end speech signal 110 is adjusted at 146, in accordance with output generated by speaker volume control module 144 to compensate for dynamic characteristics of speaker 108. The resulting volume compensated signal 113 is used to drive speaker 108 and as an input to far-end speech energy estimator 136 to detect energy in the far-end speech signal 110. The far-end speech energy estimate provided by estimator 136 is used by talking mode detectors 116 and 118, and by far-end noise floor estimator 140. A near-end speech energy estimator 138 responds to compensated signal 126 to provide a near-end speech energy estimate for use by near-end noise floor estimator 148, talking mode detector 118 and echo return loss estimator 142 and talking mode detector 116. Estimators 136 and 138 preferably operate by taking the mean square root, or magnitude of the respective input signal, and utilizing a low-pass filter, which produces a value indicative of the energy contained in the respective input signal.

Dual talking mode detectors 116 and 118 detect an operational mode from a group of operational modes which include: (1) quiescent mode, in which neither speakerphone 101 nor remote station 103 is transmitting; (2) transmission mode, in which speakerphone 101 is transmitting and remote station 103 is quiescent; (3) receive mode, in which remote station 103 is transmitting and speakerphone 101 is quiescent; and (4) double-talking mode, in which both speakerphone 101 and remote station 103 are transmitting. Talking mode detectors 116 and 118 both preferably operate in a manner described further below.

Separate talking mode detectors for the non-linear processor 128 and the adaptive filter 120 are advantageously employed in order to provide for the different requirements of the non-linear processor and the adaptive filter. It is desirable to stop the adaptation of the filter 120 while the AEC 100 is operated in either quiescent or double-talking mode when the ratio of the near-end signal and far-end signal is greater than a predetermined value. In order to accurately do so, the mode detection for the adaptation filter 120 requires different characteristics than that for the non-linear processor 128. Ideally, the nonlinear processor requires quick response to reduce the cut-off of the conversation occurring between device 101 and remote station 103. It is also less tolerant to the false detection of double-talking mode. A talking mode detector for the adaptive filter, on the other hand, requires a third mode for the double-talking mode with low near-end speech energy. In this mode, the adaptive filter is still able to converge with a smaller update gain. Thus, it is difficult to optimize a single talking mode detector for both functions.

Talking mode detector 116 generates an output indicative of one of the four aforementioned talking modes to an adaptive filter 120 which generates an estimated echo signal 122 which has characteristics approximately that of actual echo signal seen at 105. The estimated echo signal 122 is subtracted at 124 from the near-end signal 106 to generate a first compensated signal 126.

Talking mode detector 118 generates an output indicative of one of the four aforementioned talking modes to Non-Linear Processor (NLP) 128 which provides additional echo attenuation to first compensated signal 126. The output 130 of the NLP 128 is multiplied at multiplier 132 with the first compensated signal 126 to generate transmittable speech signal 134 which is converted into analog form by a digital-to-analog (D/A) converter in module 112 and transmitted over the PSTN 102 to remote station 103.

Signal 130 is advantageously generated by NLP 128 to proportionally attenuate signal 126 based on the estimated echo return loss (ERL) 149, as provided by module 142, of the adaptive filter 120. Thus, when the adaptive filter 120 does not provide sufficient attenuation, for example during an initial condition or sudden echo-path change, then the output of the non-linear processor changes to increase the attenuation of signal 126. The enhancement of the overall system stability and echo return loss are thus maintained at the cost of lower interactivity. When the filter 120 converges, the output of the nonlinear processor changes to decrease the attenuation of signal 126 in order to increase the interactivity of the conversation. To achieve an optimal trade-off between ERL and interactivity, the additional attenuation provided by the nonlinear processor is advantageously determined by the estimated ERL 149 of the adaptive filter 120 and the talking mode detected by the detector 118. The echo return loss estimator 142 determines the estimated echo return loss by detecting the valley, using a valley detector, of the ratio between the signal 126 and reference signal, seen at 113. The following table shows the operation of the talking mode detector, NLP and adaptive filter for the various talking modes of the speakerphone:

| Talking Mode | Qualification | Nonlinear Processor Attenuation (Gnlp) | Adaption Control |
|---|---|---|---|
| Quiescent Mode | $Ens < Lnf + Tln$ and $Efs < Fnf + Tfn$ | Fixed Attenuation to maintain the system stable | No Adaption |
| Transmitting Mode | $Ens > Lnf + Tln$ and $Efs < Fnf + Tfn$ and $(Ens - Lnf)/(Efs - Fnf) > Lerl + Terl$ | No attenuation | No Adaption |

-continued

| Talking Mode | Qualification | Nonlinear Processor Attenuation (Gnlp) | Adaption Control |
|---|---|---|---|
| Receiving Mode | Efs > Fnf + Tfn and (Ens − Lnf)/(Efs − Fnf) < Lerl + Terl | Gnlp = Gdesired/Lerl | Adaption |
| Double-Talking Mode | Efs > Fnf + Tfn and Els > Lnf + Tln and (Es − Lnf)/(Efs − Fnf) > Lerl + Terl | No attenuation | if Efs/Ens > Ttrain: Adaption. Else: No adaption |

Ramp-up and Ramp-down functions are advantageously employed to smooth the non-linear processor attenuation transition. The abbreviations used in the table above are understood to have the following meanings:

Efs: far-end speech energy estimation, generated by estimator 136

Ens: near-end speech energy estimation, generated by estimator 138

Lnf: near-end noise floor, generated by estimator 148

Fnf: far-end noise floor, generated by estimator 140

Lerl: near-end echo return loss estimation, generated by estimator 142

Gdesired: the desired echo return loss, predetermined

Gnlp: Additional gain by the non linear processor, generated by NLP 128.

Ttrain: the maximum SNR for the adaptive filter to converge, predetermined

Tln, Tfn, Terl Empirically determined values.

In the table above, the column labelled "Talking-Mode" shows the different talking modes of the speakerphone. The column labelled "Qualification" shows how each of the modes in the talking-mode column are determined. The column labelled "Non-Linear Processor Attenuation (Gnlp)" shows the manner in which the NLP provides attenuation for each of the talking modes. The column labelled "Adaptation Control" shows the manner in which adaptation of the adaptive filter is controlled.

As seen in the table, the speakerphone is determined to be in quiescent mode if the near-end speech energy estimation is less than the near-end noise floor and if the far-end speech energy estimation is less than the far-end noise floor. In quiescent mode, the NLP provides a fixed amount of attenuation to maintain system stability, and no adaptation is performed in the adaptive filter. The speakerphone is determined to be in transmitting mode if the near-end speech energy estimation is greater than the near-end noise floor and if the far-end speech energy estimation is less than the near-end noise floor and if the ratio of the difference between the near-end speech energy estimation and the near-end noise floor to the difference between the far-end speech energy estimation and the far-end noise floor is greater than the near-end echo return loss estimation. In transmitting mode (which is a single-talking mode), the NLP provides no attenuation and no adaptation is performed in the adaptive filter.

The speakerphone is determined to be in receiving mode if the far-end speech energy estimation is greater than the far-end noise floor and if the ratio of the difference between the near-end speech energy estimation and the near-end noise floor to the difference between the far-end speech energy estimation and the far-end noise floor is less than the near-end echo return loss estimation. In the receiving mode (which is a single-talking mode), the NLP provides attenuation (Gnlp) as a function of the ratio of the desired echo return loss to the near-end echo return loss estimation, and the adaptive filter is in adapt mode. The speakerphone is determined to be in double-talking mode if the far-end and near-end speech energy estimations are each greater than their respective floors and if the ratio described above for the transmitting and receiving modes is greater than the near-end echo return loss estimation. In the double-talking mode, the NLP provides no attenuation. The adaptive filter adapts if the ratio of the far-end speech energy estimation to the near-end speech energy estimation is greater than the predetermined maximum signal-to-noise ratio (SNR) for the adaptive filter to converge.

The convergence detector 121 is a cross-correlation type convergence detector which employs an energy normalization factor to increase the reliability of the detection. The convergence detector generates a Filter Convergence Indication (FCI) which is indicative of the convergence of the adaptive filter 120 in accordance with relationship shown in equation (1) below:

$$FCI = \frac{L[e'(n) * o(n)]}{L[|e'(n)|] * L[|d(n)|]} \quad (1)$$

where, e'(n) is the estimated echo 122 generated by the adaptive filter 120;

o(n) is the signal 126 generated by difference module 124; and d(n) is the near-end signal 106.

A low-pass filter, seen in equation (1) as "L", is advantageously employed to approximate the relationship shown in equation (2) below which describes the convergence of the adaptive filter 120:

$$FCI = \frac{E[e'(n) * o(n)]}{\sqrt{E[e'^2(n)] * E[d^2(n)]}} \quad (2)$$

As seen in equation (1), the absolute value is used to approximate the mean-square calculation performed in the equation (2). The numerator of equation (2) is the cross-correlation of the estimated echo signal 122 and the residual echo left uncancelled by the estimated echo signal 122. The denominator of the equation (2) normalizes the cross-correlation.

Utilizing the mean square of the near-end signal 106 employed in the denominator of the relationship affords at least two advantages. First, when the filter is nearly converged, the residual echo, defined as the difference between the actual echo signal 105 and the estimated echo signal 122, is relatively small compared to the near-end speech signal 106. Under such a condition, utilization of the near-end signal to normalize the cross-correlation reduces the sensitivity of the detector to the presence or absence of near-end speech. Thus, false detection in the presence of near-end speech is reduced. A second advantage to using the mean square of the near-end signal 106 is that sensitivity of the convergence detector to divergence of the adaptive filter 120 is reduced, by making the denominator of equation (2) independent of the degree of filter convergence. In the implementation of the relationship shown in equation (2), by the low-pass operator shown in equation (1), the time constant of the low-pass filter ranges from 64 milliseconds to 512 milliseconds for 8 KHz sampled speech signals.

In addition to generating the filter convergence indication, which provides a quantitative indication of the convergence of the adaptive filter, the convergence indicator also generates a divergence indication which provides a qualitative indication of the divergence of the adaptive filter. The divergence indication is generated by comparing the FCI value to a predetermined threshold value. If the FCI value is greater than the threshold value then the divergence value is set to a value to indicate that the adaptive filter has not diverged. If the FCI value is less than or equal to the threshold value then the divergence value is set to a value to indicate that the adaptive filter has diverged.

If the adaptive filter is determined to have diverged, then the echo return loss estimator 142 is determined to have an estimated echo-return-loss value corresponding to an empirically determined maximum echo return loss which is indicative of the acoustic coupling between the speaker 108 and the microphone 104. This value is used to adjust the talking mode detectors 116 and 118 and the NLP 128. This mechanism provides two advantages. First, it provides quick self-recovery from false detection. Since the divergence detection only affects the echo return estimator value, the echo return estimator quickly recovers to the actual estimation in the case of false detection. Second, the mechanism provides quick and accurate response. The primary consequence of a sudden echo path change is the divergence of the adaptive filter, which leads to a significant degradation in the ability of the adaptive filter to effectively cancel acoustic echo. Ideally, the talking mode detectors and the NLP should react quickly and correctly to the change in the echo return of the adaptive filter. The mechanism described above advantageously quickly sets the estimated echo-return-loss value to a value which is indicative of its worst case, and is then allowed to decay quickly to the actual level. The echo return loss estimator 142, which is a valley detector, provides rapid decay, and accordingly, quick reduction of the echo return loss estimation to the appropriate level. A self-recovery mechanism is provided if a false divergence detection is made, or if a divergence detection is missed. In such a situation, the echo return loss estimator will correct itself by detecting the valley of the ratio between the modified near-end signal 124 and the reference signal 113.

The structure shown in FIG. 1 is for illustration purposes only. Preferably the functional modules seen in FIG. 1 are implemented by a microprocessor operating under stored program control. The microprocessor makes use of a Read-Only Memory (ROM) for storage of control programs and permanent data and Random Access Memory (RAM) for temporary storage of programs and data. Input/Output (I/O) circuitry is incorporated either in the microprocessor or in peripheral chips for receiving and transmitting information to and from the microprocessor.

Although the foregoing description of the preferred embodiment will enable a person of ordinary skill in the art to make and use the invention, a detailed assembly language subroutine_listing of a preferred program which may be executed by the microprocessor to implement the above described operations is listing below. In the listing below, the code at line numbers 226–254, 352–399, and 457–515 corresponds to the adaptive filter 120. The code at line numbers 264–338 corresponds to the convergence detector 121. The code at line numbers 339–351 and 408–443 corresponds to the echo return loss estimator 142 and the energy floor estimators 136 and 138. The code at line numbers 523–689 corresponds to the nonlinear processor 128. The code for the talking mode detectors is implemented as conditional execution code in the adaptive filter and nonlinear processor code.

The program listed below may be converted into machine executable form using the TMS 320C2/C5x Assembler available from the Texas Instruments Corporation. Additional detailed features of the system will become apparent to those skilled in the art from reviewing the program.

A preferred embodiment of the present invention has been described herein. It is to be understood, of course, that changes and modifications may be made in the embodiment without departing from the true scope and spirit of the present invention, as defined by the appended claims. For instance, although the specific embodiment described above takes the form of an acoustic echo device for a speakerphone, application of the principles described herein, to other types of devices, such as hybrid echo cancellers, will be apparent to those skilled in the art.

```
************************************
*       Acoustic Echo Controller
*
*
* Copyright 1995 U.S. Robotics Access Corp.
************************************
        .mmregs
        .include "spp.inc"

.def    aecho_init,aecho_cres, st_aecho
        .def    ay0, as0
        .def    sar0,sar1,sar6,sar7
        .def    aec_coef_def_lo, aec_coef_def_hi, aec_copy, aec_coef_def_end
        .ref    vol
        .ref    llerl offset      .equ    00000h      ;external ram: no offset between data and program
NBLK        .equ    16          ;16: Block factor: must be 2**n
GAIN        .equ    4           ;
LU_Y        .equ    7           ;reference energy estimation: P=8;0.125*2**7
                                ;16 ms
LU_X        .equ    7           ;residual energy constant: t=16ms
LU_K1       .equ    11          ; K1: 256 MS
LU_K2       .equ    11          ; K2: 256 MS
LU_K3       .equ    11          ; K3: 256 MS
LU_snf      .equ    15          ; slow estimation: 8 sec
LU_ser      .equ    14          ; slow estimator echo return loss
                                ; 2 sec for 1/2 MAX
LU_lgain    .equ    8           ; gain adaption:64 ms
LU_lgup     .equ    9           ;gain up adaption: 128ms
LGAIN       .equ    3           ;3: -36db ER, 4: -30db ER threy       .equ    0048        ;update threshold
ths1        .equ    004h        ;quiecent threshold
ths2        .equ    0105        ;base for DBL talking detection
thsmax      .equ    0146        ; 18 db for training threshold
tmabso1     .equ    2000        ;abso /2 time: 1000*0.125=125ms
tmabso2     .equ    1000        ;abso /4 time: 2900*0.125=250 ms
tmrtro      .equ    2990        ;near speech detect glitch time 2.5ms
```

```
hangover    .equ    3000        ;375 ms hangover
thdv        .equ    1860        ;initial threshold for the divergence
                                ;
thyld       .equ    120         ;yield LEC training
nfini       .equ    48          ;initial noise floor: 48
lerlini     .equ    636         ;initial echo return loss: -10db
lgainini    .equ    32767           ;initial loopback gain:  0db

* static array:

y0          .usect "spdl",319   ;the reference signals delayed line: Y0 is entry level
y319        .usect "spdl",1
y320        .usect "spdl",14
y270        .usect "spdl",1
y271        .usect "spdl",1 a319        .usect "spcf",319
a0          .usect "spcf",1
al319       .usect "spcf",319
al0         .usect "spcf",1
                                ;normalized error delay line
u0          .usect "spcf",14
u14         .usect "spcf",1
u15         .usect "spcf",1
nu0         .usect "spcf",15
nu15        .usect "spcf",8
*global variable:
xec         .usect "spsv",1     ;near end signal
output      .usect "spsv",1
* static variable
eone        .usect "spsv",1
absy        .usect "spsv",1     ;estimation of the reference amp: 14 msb
absyl       .usect "spsv",1     ; 16LSb of the estimation
absout      .usect "spsv",1     ;output amp
absoutl     .usect "spsv",1     ;lsb of the amp
gcount      .usect "spsv",1     ;the group counter
hoabso      .usect "spsv",1     ;the absout hangover
choabso     .usect "spsv",1     ;the absoutput hangover counter
gain        .usect "spsv",1     ;the adaptive gain.
K1          .usect "spsv",1         ;estimation of the K1
K1l         .usect "spsv",1         ;the LSB of the K1
K2          .usect "spsv",1         ;estimation of the K2
```

```
        K2l       .usect "spsv",1        ;the LSB of the K2
        K3        .usect "spsv",1        ;the estimation of the K3
        K3l       .usect "spsv",1        ;The LSB of the K3
        lnf       .usect "spsv",1        ;noise floor estimator
        lnflsb    .usect "spsv",1        ;lsb
        lerl      .usect "spsv",1        ;echo return loss estimator
        lerllsb   .usect "spsv",1        ;lsb
        lgain     .usect "spsv",1        ;additional gain process
        lgainlsb  .usect "spsv",1
        flg_train .usect "spsv",1        ;trainning
        flag flg_cnv .usect "spsv",1     ;convergence flag

* local variables: can be overlayed    with other save level routines.
* but must reside in the same page as static variable absx      .usect "splv",1        ;
        abso      .usect "splv",1        ;abso and absy0: overlay absy0     .usect "splv",1        ;absy0
        iabsy     .usect "splv",1        ; 20 format of 1/absy where absy is 214
        format.
        sar0      .usect "splv",1        ;save the AUX register context
        sar1      .usect "splv",1
        sar6      .usect "splv",1
        sar7      .usect "splv",1
        sft       .usect "splv",1
        aspmst    .usect "splv",1
        asst1     .usect "splv",1
        K4        .usect "splv",1                       ; K4=K2*K3
        tmpaec    .usect "splv",1
        tr_upda   .usect "splv",1        ;debug .text

************************************
* echo initialization: aecho_init
*
************************************ aecho_init:
        mar       *,ar1
        lar       ar1,#y0
```

```
           rptz    #271
           sacl    *+ lar     ar1,#u0
 5         rptz    #15
           sacl    *+ lar     ar1,#xec
           rptz    10
10         sacl    *+ ldp     #eone
           sacl    K1
           sacl    K11
15         sacl    K2
           sacl    K21
           sacl    K3
           sacl    K31
           splk    #nfini,lnf
20         splk    #lerlini*4/5,lerl        ;initial lerlini*4/5
           splk    #lgainini,lgain
           lacc    #1
           sacl    eone
           sacl    flg_train
25         lacc    #hangover
           sacl    hoabso
           sacl    choabso
           ret 30  ***************************** *
    * echo coefficients reset: echo_cres
    *
    *************************** aecho_cres:
           mar     *,ar1
35         lar     ar1,#a0
           rptz    #11
           sacl    *-
           rpt     #19
           blpd    #CL100,*-
40         rptz    #287
           sacl    *-
           ret
```

```
     CL100:
           .word   00744h,0cfeh,0fb52h,0681h
           .word   0f6f1h,0e477h,01244h,0fd94h
           .word   0ff0ah,00534h,00237h,00944h
 5         .word   0f8afh,00dd3h,0f6b5h,016eh
           .word   011fh,0f7bdh,0028eh,0f65ah

*******************************  *
10   * st_echo routine:
     *      input:
     *
     *
     ***********************  st_echo:
15   *       save ar registers file used by
             ldp    #sar0                    ;save ar0,ar1,ar6,ar7,st1(for PM) pmst,
             mar    *,ar6
             sar    ar0,sar0
             sar    ar1,sar1
20           sar    ar6,sar6
             sar    ar7,sar7
             lar    ar6,#aspmst
             lamm   pmst
             sacl   *+
25           sst    #1,* spm    0                        ;0 shift mode
             lamm   pmst                     ;enable trm
             or     #02h
30           samm   pmst lacc   flg_train                ;preset the line echo cancellation flag
             sacl   flg_lupdate
             splk   #0,tr_upda               ;debug
35           ldp    #y0
             lacc   y0,14                    ;scale y0 to S13 format
             sach   y0
             ldp    #xec
             abs
40           sach   absy0
             lacc   xec,14                   ;scale xec to s13 format
             sach   xec
```

```
            abs
            sach    absx

* calculate absy
5           lacc    absy,16
            adds    absyl
            sub     absy,(16-LU_Y)          ;acc=absy*2**16-absy*2**(16-LU_Y)
            add     absy0,(16-LU_Y)
            sach    absy
10          sacl    absyl

* calculate 1/absy
            lacc    eone,16
            rpt     #14
15          subc    absy
            sacl    iabsy

* calculate 320 tap Fir
20   * move y320~y270 one position lar     ar6,#y270
            rpt     #14
            dmov    *-
25
     * fir filter rptz    #319
            macd    a319+offset,*-
30          apac                            ;acc = e'*2**15
            add     eone,14
            bsar    15
            sacl    sft                     ;save e' to sft
            sub     xec
35          neg                             ;acc=x-e' sacb                            ; limit output range to s13
            lacc    #-8192          ;
            crgt
40          lacc    #8191   ;
            crlt
            lacb
```

BANNER & ALLEGRETTI, LTD.
10 South Wacker Drive
Chicago, Illinois 60606
Telephone (312) 715-1000

```
            sacl    output              ;output
            abs
            sacl    abso                ;|output|

5   * calculate the output energy:
            lacc    absout,16
            adds    absoutl
            sub     absout,(16-LU_X)
            add     abso,(16-LU_X)
10          sach    absout
            sacl    absoutl

*
     * convergence indicator
15   *

* calculate K3=E(|near-end|)
            lacc    K3,16
            adds    K3l
20          sub     K3,(16-LU_K3)
            add     absx,(16-LU_K3)
            sach    K3
            sacl    K3l 25   * calculate K2=E{E'*X')
            lacc    K2,16
            adds    K2l
            sacb
            add     eone,(LU_K2-1)
30          bsar    LU_K2
            sbb
            sacb
            lt      sft
            mpy     output
35          pac
            add     eone,(LU_K2-6)
            bsar    (LU_K2-5)           ;Note: K2 is S15 format. e', x' are  s13
            sbb                         ;PM =0
            sach    K2
40          sacl    K2l

* calculate K1=E(|e'|)
```

```
                lacc    K1,16
                adds    K11
                sub     K1,(16-LU_K1)
                sacb
 5              lacc    sft,(16-LU_K1)
                abs
                addb
                sach    K1
                sacl    K11
10      * calculate K4=E(|e'|*E(X');
        *       normalize K1 to 6
                lar     ar6,#6              ;arp: point to ar6
                rpt     #5                  ; increase the resolution of K|e'|
                norm    *-
15              bsar    16
                samm    treg0               ;
                mpy     K3                  ;k3: 13 bit signed
                lmmr    treg1,#ar6          ;load the shift
                pac                         ;pm=0
20              satl                        ;
                sacb
                sach    K4,7
        * compare E(|e'|)*E(|x'|) and |E(e'*x')*thdv|
                lacc    K2,16
25              adds    K21
                abs
                sub     #45,10              ;K2>45?
                bcnd    cnext,lt            ;|<0: converge
                add     #45,10
30              bsar    10
        * saturate K2
                sub     eone,15
                nop
                xc      2,geq               ;if acc>32768: acc=32767
35              lacc    #-1
                add     eone,15
                samm    treg0
                mpy     #thdv
                pac
40              sbb
                nop
                xc      2,gt                ;diverge situation
```

```
             splk    #lerlini,lerl

* convergence indicator end cnext:
       * calculates the instant echo return
 5           lt      iabsy
             mpy     absout
             pac                           ;spm=0: global default for ISR
             bsar    6                     ;1:-42db ~ +48db(7fffh)
                                           ;bit9: 0db; bit 6: -18db
10           sub     eone,15                       ;saturate to 7fffh
             nop
             xc      2,geq
             lacc    #-1
             add     eone,15
15           sacl    tmpaec

* calculate the normalized error
       * move u30 ~ u0 one position: note u can be in external memory. avoid dmov
       * dynamic scaling see notebook Page 12-13
20           lacc    #14                   ;repeat 15 times
             samm    brcr
             lar     ar6,#u14
             lar     ar7,#u15
             larp    ar6
25           zac                           ;accb=0
             sacb
             rptb    umov_end-1 umov:
             lacc    *-,ar7
             sacl    *-,ar6
30           abs                           ;
             addb
             sacb umov_end
             mar     *+                    ;ar6 point to u0
             lt      output
35           mpy     iabsy
             pac
       * satuate the u to 2**14 format
             sub     #4000h
             bcnd    possat,geq
40           pac
             add     #4000h
             bcnd    negsat,lt
```

```
            bd      saveun
            pac
            nop possat:
            bd      saveun
 5          lacc    #4000h negsat:
            lacc    #0c000h saveun
       * determine the error term scale factor
            sacl    *                       ;u0 in the place
            abs
10          addb                            ;acc=sumu=sum{abs(un))
            bsar    3
            sacl    sft
            lacc    sft,16                  ;acc=sumu*2**(31-14-log2N): N=16
            lar     ar6,#0
15          rpt     #15
            norm    *+                      ;ar6=norm(sumu*2**13)
            mar     *-                      ;ar6=T-1
            lamm    ar6
            sacl    sft                     ;sft=T-1
20          xc      2,lt
            zac                             ; then sft=0
            sacl    sft

* detect max near-end speech
25          lacc    tmpaec,2
            sub     #thsmax,2
            sub     lerl,2
            sub     lerl
            bcnd    weaky,gt
30
       * noise floor echo return loss estimator:

* calculate the noise floor estimation
            lacc    lnf,16
35          adds    lnflsb
            sub     lnf,(16-LU_snf)         ;acc=lnf*2**16-lnf*2**(16-LU_Y)
            add     absout,(16-LU_snf)
            sach    lnf
            sacl    lnflsb
40     * compare ls and the nf; if ls<nf;nf=ls
            sacb
            lacc    absout,16
```

```
                crlt
                exar
                sach    lnf
5       *determine update
                lacc    absy                    ;reference signal strong? yes update; else exit.
                sub     #(threy)                ;update: only NSR>2
                sub     lnf
                bcnd    weaky,lt
10
        * echo return loss estimation
                lacc    lerl,16
                adds    lerllsb
                sub     tmpaec,16
15              bcndd   qler,gt
                add     tmpaec,16
                nop
                bd      lernext
                sub     lerl,(16-LU_ser)        ;slow upward
20              add     tmpaec,(16-LU_ser) qler:
                sub     lerl,(16-(LU_ser-3))    ;quick down
                add     tmpaec,(16-(LU_ser-3))          lernext:
                sach    lerl
                sacl    lerllsb
25
        wnext:
        *
        *the update of the coefficient
30      * update:
                lacc    flg_train               ;flg_train=0: no updating
                bcndd   exit,eq
                lacc    llerl                   ;load the lec's ERL
                sub             #thyld          ; see if need yield
35              bcnd    exit,gt splk    #0,flg_lupdate ;no train for line echo either
                splk    #1,tr_upda              ;debug
        * update the counter
40              lacc    gcount
                add     #1
                and     #(NBLK-1)
```

```
                sacl    gcount

* update the coefficient for each group 5               lar     ar0,#NBLK           ;ar0: block factor
                lar     ar1,#nu0            ;ar1: nun0
                lacc    #(320/NBLK-1)
                samm    brcr 10              lacc    #(y0+1)             ;POINTer TO Y
                add     gcount
                samm    ar6 lacc    #16
15              sub     sft
                samm    treg1               ;treg1: 15-sft for nu(i) scale.

rptb    nuloop_end-1 nuloop:
                rptz    #(NBLK-1)
20               mac    u0+offset,*+
                apac
                satl
                mar     *,ar1               ;accl=sum(u*y)*2**(-(16-sft)))
                sacl    *+,ar6 nuloop_end:
25
                lacc    #(320/NBLK-1)
                samm    brcr
                lmmr    treg1,sft           ;treg1=sft, for compensate scale
                lacc    #GAIN               ;get the gain*iabsy
30              samm    treg0
                mpy     iabsy
                pac
                samm    treg0               ;treg0=fact=iabsy*gain
                lacc    #a0
35              sub     gcount
                samm    ar6                 ;ar2: point to the coefficients
                lacc    #al0
                sub     gcount
                samm    ar7                 ;ar1 point to lsb of the coef.
40              lacc    #nu0
                samm    ar1
                spm     02
```

```
            rptb    update_end-1 uploop:
            lacc    *,16,ar7
            adds    *,ar1
            sacb
            mpy     *+,ar6
            pac
            satl
            addb
            sach    *0-,ar7
            sacl    *0-,ar6         update_end:
            spm     00 weaky: exit: softvox:

*
    * Closed loop gain control *

* gain adaptation:

mar     *,ar6
            lar     ar0,#0          ;arcr: 0
            lacc    absout,3        ;output energy <ths1+1.125nf:
            sub     #ths1,3
            sub     lnf
            sub     lnf,3 lar     ar6, choabso
            mar     *-
            cmpr    00              ;ar6=0?
            sar     ar6,choabso     ;no: choabso--
            xc      2,tc            ;yes: chabso=01
            splk    #1,choabso
            xc      1,gt            ;absout>ths1? yes: chabso=hangover
            dmov    hoabso

*
    * absout gain control:

lacc    choabso
            sub     #tmabso2
            bcnd    asgnext,gt
```

```
* calculate the attenuation according to the volume
         ldp    #0
         lacc   vol,16
         ldp    #eone
 5       lar    ar6,#gainqiet
         rpt    #2
         norm   *+ lacc   output,2
10       sacl   output lacc   *                    ;load the attenuation
         samm   treg0
         mpy           output
15       bd     exit2
         pac
         bsar   15 asgnext:
20       lacc   choabso
         sub    #tmabso1
         bcndd  exit2,lt
         lacc   output,2             ;transition silence state: 0db
         nop
25
* output/reference ratio hangover lacc   absy                 ;reference energy <threy+nf: gain=1
         sub    #threy
30       sub    lnf
         bcnd   gainup,lt lacc   tmpaec,3             ;load instant echo return loss
         sub    lerl,3               ;-1.125 erl estimator
35       sub    lerl
         sub    #ths2,3
         bcnd   gainup,gt            ; skip some glitch

*********************************** *
40  * Closed-loop gain control using desired echo/speech ratio: ECL
    *
    *    acoustic coupling at the norminal level: +6db at vol=2000h
```

```
*       desired level: -30db
*       speaker volume: vol
*       nominal speaker volume: 2**13
*
* * * * * * * * * * * * * * * * * * * * * * * * * * * lacc    eone,16
        rpt     #14
        subc    lerl                    ; 32768/lerl->treg0
        samm    treg0 lamm    vol                     ;if volume>nominal volume:
        sub             #2000h          ;the nonlinear processor use nominal volume
        nop
        xc      1,      leq
        zac
        add             #2000h
        sacl    tmpaec lacc    eone,16                 ;32768/vol->tmpaec
        rpt     #14
        subc    tmpaec
        sacl    tmpaec mpy     tmpaec
        pac                             ;pm=0 at this moment
        apac                            ; for -30db desired echo/speech level
                                        ; if desired is -36db: skip the left shift
        sub     eone,15                 ;saturate at 2**15
        nop
        xc      1,geq
        zac
        add     eone,15
        sacl    tmpaec                  ;tmpaec now stored instant gain

* gain adptaton
        lacc    lgain,16
        adds    lgainlsb
        sub     lgain,(16-LU_lgain)
        add     tmpaec,(16-LU_lgain)
        sach    lgain
        sacl    lgainlsb
```

```
            bsar    16 adjgain:
            samm    treg0
            lacc    output,2
            sacl    output
 5          mpy     output
            pac
            bsar    15 exit2:
10          mar     *,ar6
            lar     ar6,#aspmst+1          ;restore st1 and pmst
            lmmr    pmst,#aspmst
            lst     #1,*
            lar     ar0,sar0
15          lar     ar1,sar1
            lar     ar6,sar6
            lar     ar7,sar7
            ret 20    gainup:
      * gain adptaton
            splk    #7fffh,tmpaec
            lacc    lgain,16
            adds    lgainlsb
25          sub     lgain,(16-LU_lgain)
            add     tmpaec,(16-LU_lgain)
            sach    lgain
            sacl    lgainlsb
            bsar    16
30          samm    treg0
            lacc    output,2
            sacl    output
            mpy     output
            bd      exit2
35          pac
            bsar    15

40    *quiecent attenuation table
      *     vol:            attenuation
      *     +6~+12db    -9db
```

BANNER & ALLEGRETTI, LTD.
10 South Wacker Drive
Chicago, Illinois 60606
Telephone (312) 715-1000

```
      *     0 ~ +6db              -6db
      *     -6db ~ 0db      -3db
      *     -- ~ -6db             -3db gainqiet:
            .word   11626,16384, 23198  ,23198
5
      * * * * * * * * * * * * * * * * * * * * * * * *
      *
      * equivalent symbols
      *
10    * * * * * * * * * * * * * * * * * * * * * * * *
      aa0             .set    a0
      flg_aupdate     .set    flg_train s
      0dc             .set    xec
      yec             .set    y0              ;reference signal
15    as0             .set    xec
      ay0             .set    y0
      st_aecho        .set    st_echo
```

What is claimed is:

1. An acoustic echo control device that suppresses echoes, comprising:
    a first talking mode detector for providing a first signal indicative of one of three talking modes;
    an adaptive filter responsive to said first signal, said adaptive filter generating a replica of the echo component of a near-end signal;
    a summer device that subtracts the replica of the echo component of the near-end signal from the near-end signal for producing a modified near-end signal;
    a second talking-mode detector for providing a second signal indicative of one of three talking modes; and
    a nonlinear attenuator wherein said nonlinear attenuator provides one of no attenuation, attenuation that adjusts to achieve a desired echo return loss, and a fixed amount of attenuation, of the modified near-end signal in response to said second talking-mode detector.

2. An acoustic echo control device of claim 1 further comprising:
    a convergence detector for producing a convergence indicator in response to the near-end signal, the modified near-end signal, and the echo replica.

3. An acoustic echo control device of claim 2 wherein said convergence detector is a cross-correlation type convergence detector that employs an energy normalization factor.

4. An acoustic echo control device of claim 2 wherein said convergence indicator is determined in accordance with the equation:

$$FCI=L[e'(n)*o(n)]/(L[|e'(n)|]*L[|d(n)|])$$

where,
    L is a low-pass filter;
    e'(n) is the echo replica generated by the adaptive filter;
    o(n) is the modified near-end signal; and
    d(n) is the near-end signal.

5. An acoustic echo control device of claim 2 wherein said convergence detector further comprises a correlator for generating a correlation of said echo replica and said modified near-end signal.

6. An acoustic echo control device of claim 5 wherein said convergence detector further comprises a normalizer for normalizing said correlation with respect to said echo replica.

7. An acoustic echo control device of claim 5 wherein said normalizer also normalizes said correlation with respect to said modified near-end signal.

8. An acoustic echo control device of claim 5 wherein said normalizer further comprises a second correlator for generating a second correlation of said echo replica and said modified near-end signal, wherein said normalizer normalizes said correlation with respect to said second correlation.

9. An acoustic echo control device of claim 2 wherein said nonlinear attenuator provides attenuation that adjusts to achieve a desired echo return loss in response to said convergence indicator in response to a predetermined level of echo return loss.

10. An acoustic echo control device of claim 2 further comprising a near-end signal energy detector and a far-end signal energy detector, wherein said nonlinear attenuator is responsive to said far-end and near-end signal energy detectors.

11. An acoustic echo control device of claim 2 wherein said convergence indicator is normalized with respect to the near-end signal.

12. A method for suppressing the echo component of a near-end signal, comprising the steps of:
    generating a replica of an echo component of a near-end signal;
    subtracting the replica of the echo component of a near-end signal from the near-end signal to produce a modified near-end signal;
    producing, from first and second talking mode detectors, first and second talking mode signals indicative of one of three talking modes;
    adapting filter coefficients in response to said first talking mode signal; and
    attenuating the modified near-end signal in response to said second talking mode signal, wherein the attenuation is fixed, adjusted to achieve a desired echo return loss, or nonexistent, depending on the talking mode that is indicated by said second talking mode signal.

13. The method of claim 12 further comprising the step of:
    producing a convergence indicator in response to the near-end signal, the echo replica, and the modified near-end signal.

14. The method of claim 13 wherein the step of generating the replica of the echo component of the near-end signal includes using an adaptive filter.

15. The convergence indicator of claim 14 wherein the indicator is indicative of convergence of the adaptive filter in accordance with the equation:

$$FCI=L[e'(n)*o(n)]/(L[|e'(n)|]*L[|d(n)|])$$

where,
    L is a low-pass filter;
    e'(n) is the echo replica generated by the adaptive filter;
    o(n) is the modified near-end signal; and
    d(n) is the near-end signal.

16. The method of claim 13 wherein the step of producing a convergence indicator is performed using a cross-correlation type convergence detector that employs an energy normalization factor.

17. The method of claim 13 wherein the convergence indicator is normalized with respect to the near-end signal.

18. The method of claim 12 wherein the step of producing the convergence indicator comprises the step of correlating the echo replica with the modified near-end signal.

19. The method of claim 18 wherein the step of producing the convergence indicator comprises the step of normalizing the correlation with respect to the echo replica.

20. The method of claim 18 wherein the step of producing the convergence indicator comprises the step of normalizing the correlation with respect to the near-end signal.

21. The method of claim 18 wherein the step of producing the convergence indicator comprises the step of normalizing the correlation with respect to the correlation of the echo replica and the near-end signal.

22. The method of claim 12 wherein the step of attenuating is performed in response to a predetermined level of echo return loss.

* * * * *